United States Patent
Gardner et al.

(10) Patent No.: US 9,746,938 B2
(45) Date of Patent: Aug. 29, 2017

(54) EXCLUSIVE VIEW KEYBOARD SYSTEM AND METHOD

(71) Applicant: AT&T Intellectual Property I, L.P., Atlanta, GA (US)

(72) Inventors: Christina Gardner, Duluth, GA (US); William Shaw, Kennesaw, GA (US); Timothy Innes, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 208 days.

(21) Appl. No.: 14/569,905

(22) Filed: Dec. 15, 2014

(65) Prior Publication Data
US 2016/0170497 A1   Jun. 16, 2016

(51) Int. Cl.
| | |
|---|---|
| *G06F 3/023* | (2006.01) |
| *G06F 3/042* | (2006.01) |
| *G06F 21/31* | (2013.01) |
| *G06F 3/0488* | (2013.01) |
| *H04L 29/06* | (2006.01) |
| *H04W 12/06* | (2009.01) |

(52) U.S. Cl.
CPC .......... *G06F 3/023* (2013.01); *G06F 3/0426* (2013.01); *G06F 3/04886* (2013.01); *G06F 21/31* (2013.01); *H04L 63/083* (2013.01); *H04W 12/06* (2013.01); *G06F 2221/031* (2013.01)

(58) Field of Classification Search
CPC .......... G06F 21/31; G06F 21/53; G06F 21/83; G06F 21/6218; G06F 2221/2105
See application file for complete search history.

(56) References Cited

U.S. PATENT DOCUMENTS

| | | | |
|---|---|---|---|
| 6,720,860 B1 * | 4/2004 | Narayanaswami | G06F 21/31 340/5.54 |
| 6,980,081 B2 | 12/2005 | Anderson | |
| 7,219,368 B2 | 5/2007 | Juels et al. | |
| 7,644,868 B2 | 1/2010 | Hare | |
| 7,705,829 B1 | 4/2010 | Plotnikov | |
| 7,946,477 B1 * | 5/2011 | Ramachandran | G06K 7/0004 235/379 |
| 7,992,202 B2 | 8/2011 | Won et al. | |
| 8,176,332 B2 | 5/2012 | Drake | |
| 8,239,937 B2 * | 8/2012 | Bedworth | G06F 21/36 340/5.81 |

(Continued)

OTHER PUBLICATIONS

Authenticating Mobile Device Users Through Image Selection; Wayne Jansen; The National Institute of Standards and Technology; The Internet Society: Advances in Learning, Commerce and Security 1 (2004) 183-194.

(Continued)

*Primary Examiner* — Nelson Rosario
*Assistant Examiner* — Nathan Brittingham

(57) ABSTRACT

A secure computer keyboard system utilizes a mobile device in conjunction with a keyboard device to provide secure keyboard entry in a public place. An application on the mobile device produces a mapping of characters to character codings, and displays to the user a key such as a modified keyboard showing the mapping. The keyboard device receives input keystrokes from the user representing the codings and transmits the keystrokes back to the mobile device or to a server. The mobile device or server decodes the keystrokes using the mapping.

20 Claims, 7 Drawing Sheets

(56) References Cited

U.S. PATENT DOCUMENTS

| | | |
|---|---|---|
| 8,307,424 B2 | 11/2012 | Hirakawa |
| 8,347,103 B2 | 1/2013 | Jones et al. |
| 8,621,578 B1 | 12/2013 | Blomquist et al. |
| 8,843,755 B2 | 9/2014 | Heiner et al. |
| 2003/0080945 A1 | 5/2003 | Betts-LaCroix |
| 2003/0159053 A1* | 8/2003 | Fauble ................ G06F 21/83 713/189 |
| 2003/0159054 A1* | 8/2003 | Fauble ................ G06F 21/83 713/189 |
| 2003/0210127 A1* | 11/2003 | Anderson ............ G06F 21/36 340/5.27 |
| 2004/0186820 A1* | 9/2004 | Izume ............. G06F 17/3028 |
| 2004/0230843 A1 | 11/2004 | Jansen |
| 2007/0209014 A1 | 9/2007 | Youmtoub |
| 2008/0060052 A1 | 3/2008 | Hwang et al. |
| 2008/0077974 A1 | 3/2008 | Ogawara |
| 2008/0244700 A1* | 10/2008 | Osborn ................ G06F 21/36 726/2 |
| 2008/0250481 A1* | 10/2008 | Beck ................ H04L 63/083 726/6 |
| 2009/0024506 A1* | 1/2009 | Houri ................ G06Q 40/00 705/35 |
| 2009/0106825 A1 | 4/2009 | Cerruti et al. |
| 2009/0106827 A1 | 4/2009 | Cerruti et al. |
| 2010/0011419 A1* | 1/2010 | Seo ................... G06F 21/36 726/5 |
| 2010/0060585 A1 | 3/2010 | Chiu |
| 2010/0137028 A1* | 6/2010 | Farris ................ H04M 1/04 455/557 |
| 2010/0180336 A1* | 7/2010 | Jones ............... H04L 9/3226 726/19 |
| 2010/0259561 A1 | 10/2010 | Forutanpour et al. |
| 2011/0191856 A1* | 8/2011 | Keen ................ G06F 21/32 726/26 |
| 2011/0238573 A1* | 9/2011 | Varadarajan ....... G06Q 20/1085 705/43 |
| 2011/0264442 A1 | 10/2011 | Huang et al. |
| 2012/0056816 A1 | 3/2012 | Ettinger |
| 2012/0110663 A1* | 5/2012 | Kim ................... G06F 21/36 726/19 |
| 2012/0124654 A1* | 5/2012 | Senac ................ G06F 21/36 726/7 |
| 2012/0160912 A1* | 6/2012 | Laracey ............. G06Q 20/1085 235/379 |
| 2012/0242659 A1 | 9/2012 | Sun |
| 2013/0041812 A1* | 2/2013 | Aubin ................ G07F 19/20 705/39 |
| 2013/0091583 A1 | 4/2013 | Karroumi et al. |
| 2013/0117813 A1* | 5/2013 | Yudkin ................ G06F 21/00 726/2 |
| 2013/0124855 A1* | 5/2013 | Varadarajan ....... G06Q 20/3276 713/155 |
| 2013/0139226 A1 | 5/2013 | Welsch et al. |
| 2013/0182015 A1 | 7/2013 | Kuo et al. |
| 2013/0238497 A1* | 9/2013 | Ramachandran ...... G06Q 20/36 705/41 |
| 2013/0321277 A1 | 12/2013 | Ha et al. |
| 2014/0053254 A1 | 2/2014 | Sun et al. |
| 2014/0096201 A1* | 4/2014 | Gupta ................ H04W 12/06 726/4 |
| 2014/0101036 A1* | 4/2014 | Phillips ............... G06Q 20/027 705/39 |
| 2014/0115670 A1* | 4/2014 | Barton ................ H04L 9/3228 726/4 |
| 2014/0160026 A1* | 6/2014 | Burckart ............ G06F 3/04886 345/168 |
| 2014/0181957 A1 | 6/2014 | Nguyen et al. |
| 2014/0214688 A1* | 7/2014 | Weiner ............... G06Q 20/3227 705/71 |
| 2014/0315519 A1* | 10/2014 | Nielsen ................ H04W 12/06 455/411 |
| 2015/0088758 A1* | 3/2015 | Varadarajan ....... G06Q 20/3276 705/71 |
| 2015/0262170 A1* | 9/2015 | Bouda ................ G06Q 20/00 705/67 |
| 2015/0332038 A1* | 11/2015 | Ramsden ............. G06F 21/36 726/19 |
| 2016/0098362 A1* | 4/2016 | Summers ............. G06F 13/102 710/73 |
| 2016/0154473 A1* | 6/2016 | Yato ................... G06F 1/1632 345/156 |
| 2016/0170497 A1* | 6/2016 | Gardner ................ G06F 3/023 345/168 |

OTHER PUBLICATIONS

Authenticating Users on Handheld Devices; Wayne A. Jansen; The National Institute of Standards and Technology; Proceedings of the Canadian Information Technology Security Symposium, 2003.

Picture Password: A Visual Login Technique for Mobile Devices; Serban Gavrila, et al.; US Department of Commerce, National Institute of Standards and Technology; 2003.

E.Miluzzo, A.Varshaysky, S.Balakrishnan, R.R. Choudhury. Tap-Prints: Your Finger Taps Have Fingerprints. In Proceedings of MobiSys'12, UK, Jun. 2012.

L. Cai and H. Chen. Touchlogger: Inferring Keystrokes on Touch Screen from Smartphone Motion. In Proceedings of the 6th USENIX conference on Hot topics in security (HotSec'11). USENIX Association, Berkeley, CA, USA, 2011.

E. Owusu, J. Han, S. Das, A. Perrig and J. Zhang. ACCessory: Password Inference using Accelerometers on Smartphones. In Proceedings of the 13th Workshop on Mobile Computing Systems and Applications (HotMobile'12). San Diego, CA, USA, Feb. 2012.

L. Cai, S. Machiraju, and H. Chen. Defending Against Sensor-Sning Attacks on Mobile Phones. In Proceedings of the 1st ACM workshop on Networking, systems, and applications for mobile handhelds, 2009.

\* cited by examiner

EXCLUSIVE VIEW KEYBOARD SYSTEM AND METHOD

TECHNICAL FIELD

The present disclosure relates to secure input via a keyboard. More specifically, the disclosure is directed to the use of mobile device in conjunction with a keyboard device to secure a keyboard input in a public place.

BACKGROUND

As the mobile public increasingly interacts with a global interconnected digital world, it is important that data is secure. It is desirable to have the freedom to securely log on, make purchases, or check one's status anywhere at any time. Data encryption can help protect Internet traffic over the wire, but in 2012 the Identity Theft Bureau of Justice Statistics reported that over $24.7 billion was still lost due to the theft of digital identities.

There are many security measures in place to protect our sensitive information once it enters the virtual sphere. There is, however, no real solution to address getting the information from the human user to the virtual sphere when the user is located in a public place.

Wearable mobile computing devices such as smart watches, sport and fitness activity bands and even augmented reality eyewear are being used in increasing quantities. Wearable smart technology has been projected to be a $50 billion industry within the next 5 years. Those new products are reaching a critical mass and are about to transform the digital landscape. This not only creates many more ways for us to connect with one another, but also generates more opportunities for identity crimes.

An area of system vulnerability is the physical space between the user and his or her device. In one example, a customer is standing in a busy clothing store that is using a mobile point-of-sale system where customers "check out" with sales representatives who wander about the store with mobile point-of-sale devices. A customer entering a password for a debit card, in a room packed with other shoppers, is exposed to the theft of that number by simple observation.

In another example, a locked door in a corporate setting utilizes a numeric keypad for entry authorization. The password entry process may be compromised by a video surveillance camera aimed at the door, or even by pedestrian traffic in the hallway. Surveillance cameras, or even cameras on mobile devices, exasperate the problem by making possible the recording of password input patterns, creating another point of vulnerability.

The entry of a password or other personal information is normally done using a standard keyboard configuration, such as the configuration 100 shown in FIG. 1A. A "standard keyboard," as that term is used herein, includes a plurality of keys in standard locations that are familiar to a typical user. The configuration 100 is known as a "QWERTY" keyboard for the beginning of the first row of letters, and evolved from the standard typewriter keyboard. The QWERTY keyboard is a standard keyboard for the entry of standard Latin alphabet characters as well as many other inputs. Other standard keyboards are used in connection with other languages and situations.

A "standard alphabet," as used herein, is a group of characters known to its users as representing individual sounds, language concepts, numbers or other abstract or tangible ideas. Examples include the Latin alphabet used in most of Europe and the Americas, the Arabic alphabet used in the Middle East, the Cyrillic alphabet used in Russia and alphabets adapted for representing logographic writing systems such as those used in China, Japan and Korea.

Passwords and other personal information may also be entered using a numeric keypad such as the keypad 150 shown in FIG. 1B. The numeric keypad is another example of a standard keyboard. The keypad 150 is based on the standard telephone keypad; other standard arrangements are also used.

It can be seen that, when data is entered using a standard keyboard, a malicious actor can deduce the entered data by observing the spatial pattern traced by the user when entering the data.

SUMMARY

The needs existing in the field are addressed by the present disclosure, which relates to keyboard systems, methods and computer useable media whereby the actual input of a user of a keyboard is hidden, even from a direct observer.

In embodiments, a method is provided for execution by a mobile device. The method is for securing a keyed input by a user through a keyboard device separate from the mobile device. A mapping is produced by the mobile device, correlating characters in a standard alphabet to key codings. On a display of the mobile device, a representation of the mapping is displayed, permitting the user to translate the characters in the standard alphabet to the key codings.

A command is transmitted to the keyboard device to cause the keyboard device to receive keystrokes from the user on a keyboard comprising the key codings. Representations of the keystrokes are then received from the keyboard device, and the keystrokes are converted to characters in the standard alphabet using the mapping, to determine a user input. The user input is then transmitted to a server.

In embodiments, the method also includes transmitting to the keyboard device a command to configure a virtual keyboard comprising the key codings for accepting the keystrokes. The key codings may include a first characteristic and a second characteristic and the command to configure the virtual keyboard may include a command to display a grid having rows representing the first characteristic and columns representing the second characteristic.

In additional embodiments, a non-transitory computer-usable medium is provided having computer readable instructions stored thereon that, when executed by a processor, cause the processor to perform the above-described operations.

In other embodiments of the present disclosure, another method is provided for execution by a mobile device for securing a keyed input by a user through a keyboard device separate from the mobile device. A mapping is produced correlating characters in a standard alphabet to key codings. A first representation of the mapping is transmitted to a secure system server, making the secure system server operable to translate keystrokes on a keyboard comprising the key codings to characters in the standard alphabet. On a display of the mobile device, a second representation of the mapping is displayed. The second representation of the mapping permits the user to translate characters of the standard alphabet to the key codings. A command is then transmitted to the keyboard device to cause the keyboard device to receive keystrokes from the user on a keyboard comprising the key codings, and to transmit representations of the keystrokes to the secure system server.

The respective objects and features of the disclosure may be applied jointly or severally in any combination or sub combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

The presently described system creates a zone of privacy in any public space, allowing one to input or retrieve sensitive personal information in a public venue without the risk of observation. The system effectively creates a "private" workspace within a public setting, providing for information anonymity for activities such as logging into accounts, making purchases and checking a Web service status such as email, bank account balances, Facebook, etc.

Figure 2:
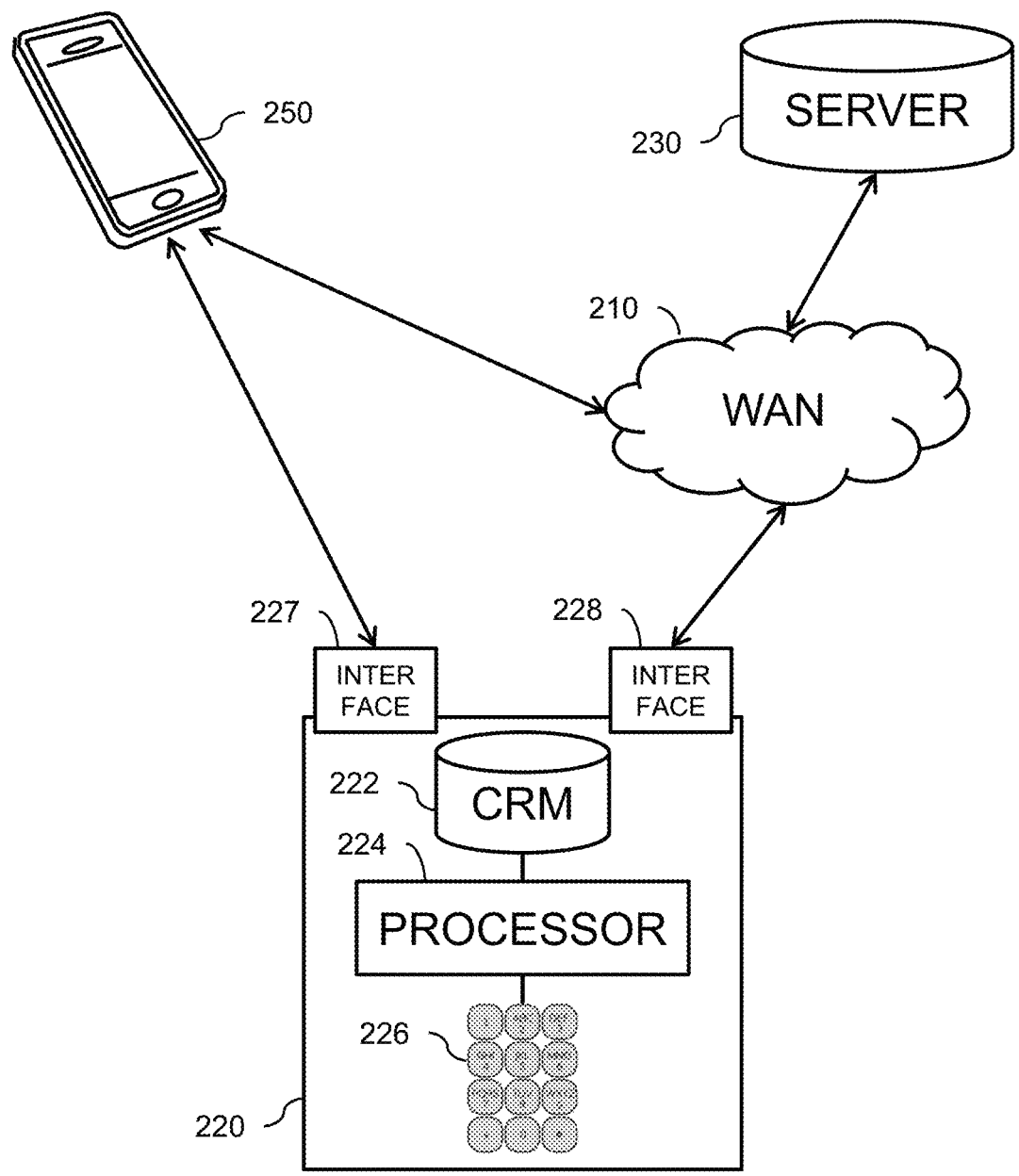
FIG. 2 is a block diagram showing links among components of a system according to embodiments of the disclosure.

As shown in the schematic system diagram of FIG. 2, a keyboard device 220 is utilized by the presently described system and method in conjunction with a user's mobile device 250 to permit secure data input. A "mobile device," as used herein, is a portable device such as a smart phone, digital assistant, cell phone or wearable device having access to one or more radio communications networks. A user's mobile device may be a secure device that is trusted by the user. In general, the mobile device 250 includes a processor, a user interface and computer readable media having computer readable instructions stored thereon that, when executed by the processor of the mobile device 250, cause the processor to perform various operations. The user interface may be a full touch screen interface plus audio input, as is the case with a smart phone, or may be much less sophisticated as is the case with many wearables.

The mobile device may have access to a wide area network 210 such as the Internet via a cellular radio data network. The mobile device may furthermore be capable of communicating with local devices such as the keyboard device 220 via a wireless interface 227 using a short range wireless link such as a Bluetooth® radio link or an infrared optical link. In embodiments, the mobile device 250 and the keyboard device 220 exchange messages in providing a secure keyboard entry system.

A server 230 may provide the service for which access is sought, and/or may provide the computational function required to check a password, etc. The server may communicate with the other devices in the system via the wide area network 210, or may be collocated with the keyboard device 220 and communicate via a local area network or bus. The keyboard device includes a network interface 228 for communicating via the WAN 210 or locally via a local area network or bus.

In embodiments, the keyboard device includes an input keyboard projector/sensor 226 that projects an image of a keyboard on a surface overlaid by an infrared light grid that is used in sensing and locating keystrokes by the user. The keyboard device 220 may alternatively utilize a touchscreen arrangement to display a virtual keyboard, or may incorporate a traditional "mechanical" keyboard including individual keys that are depressed in order to select them. A processor 224 controls the keyboard display in the case of a virtual keyboard, and interprets keystrokes.

The keyboard device 220 additionally includes computer readable media 222 having computer readable instructions stored thereon that, when executed by the processor 224, cause the processor to perform various operations.

Figure 1A:
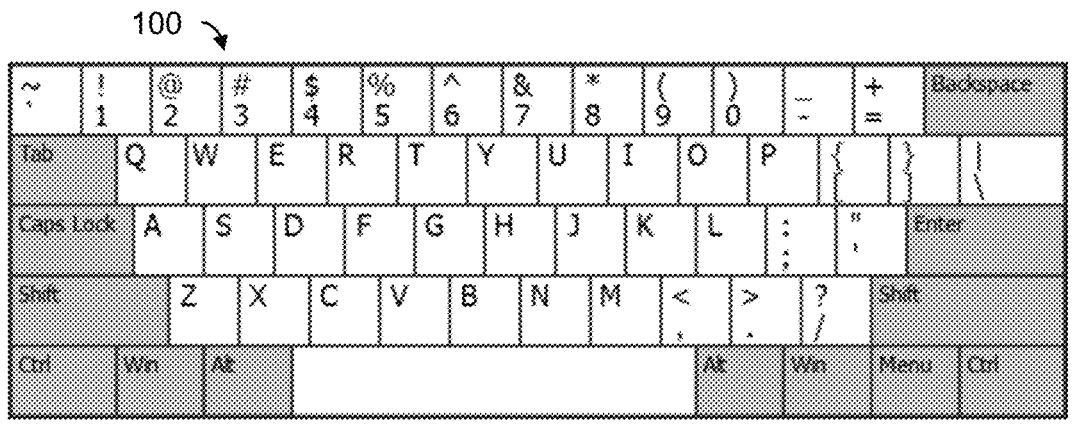
FIG. 1A is a plan view illustrating a prior art keyboard.
Figure 1B:
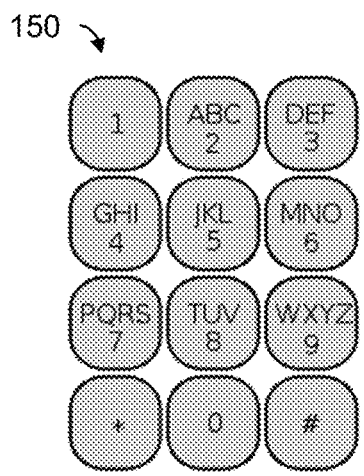
FIG. 1B is a plan view illustrating a prior art numeric keypad.

Traditionally, a virtual keyboard such as the keyboards shown in FIGS. 1A and 1B combined two functions: a projection of a standard keyboard image, and a sensor such as a low-frequency infrared light beam or a capacitive sensor to capture a user's touch patterns on the projected image. A sensor chip determines a location where a touch occurs, and software determines which character maps to which location.

The presently described system separates the two traditional virtual keyboard functions. The detection of a finger position is retained, but the projected virtual keyboard has a coded mapping that has been received from the user's mobile device or is known to the user's mobile device. The user's mobile device randomly or pseudorandomly maps characters using a translation matrix to the device's default keyboard, so that unwanted observers cannot deduce the messages being entered into the virtual keyboard.

Figure 3:
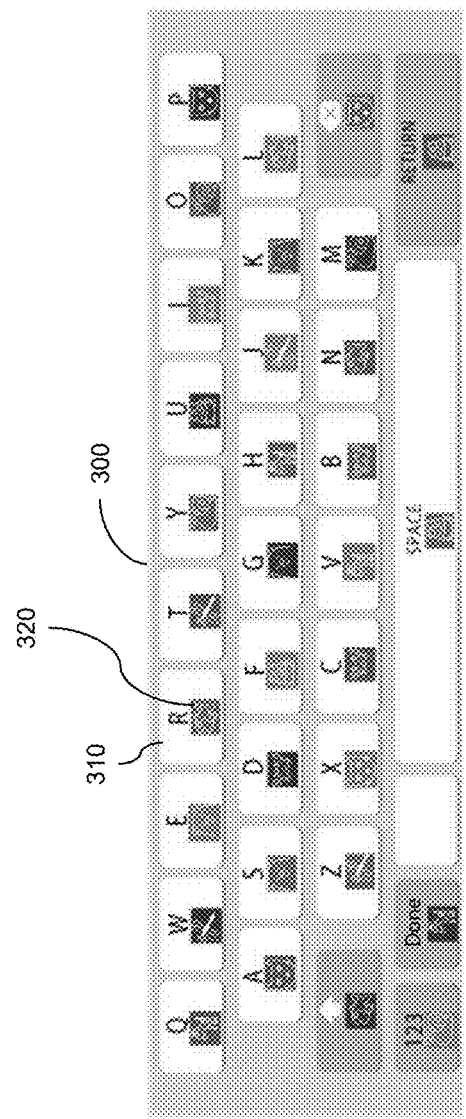
FIG. 3 is a representation of a display to a user showing keyboard keys and corresponding codings according to embodiments of the disclosure.

One example of a secure data input scheme in accordance with embodiments of the invention is illustrated with reference to FIGS. 3 and 4. The user's mobile device assigns a key coding to each key of the set that might be used in the input. In the illustrated instance, each key of a standard keyboard 300 is assigned a two-dimensional key coding. For example, the "R" key 310 is assigned a fish symbol having color x. The user is presented with a representation of the mapping such as the modified keyboard 300 that facilitates quick conversion by the user from any key on the keyboard to the mapped coding.

The assignment of the key codings may be made by randomly selecting codings for each key or by selecting one of a plurality of stored mappings. The codings are produced by the mobile device by generating the codings on-board or by loading the codings from a server connected through the cellular data network or a local wireless link.

In embodiments of the disclosure, the representation of the mapping is displayed to the user using a display of a mobile device. For example, with Google Glass®, the illustration is viewed in the Glass card. On a smartphone or tablet, the mapping representation would be displayed by an app using the device display. For a smart watch, it would be viewed on the clock face. The user has exclusive access to the character mapping on any device.

A two dimensional coding such as that illustrated in the figures, wherein code=C(color, animal), permits a user to quickly find a correct coding on the keypad presented to the user on the keyboard device. In an example of such a keypad shown in FIG. 4, a two-dimensional grid is presented to the user, in which columns represent animals and rows represent colors. Of course, other pairs of characteristics may be used. After noting on the mobile device display that a fish symbol having color x represents the "R" key, a user would use the column 410 of fish and the row 420 of color x to locate the fish of color x 320 on the keyboard device. Selecting the key 320 on the keyboard device would provide a malicious observer no information about the actual user input of "R".

While the two-dimensional format of the codings has been found to greatly facilitate input of the coded characters on the keyboard device, other coding formats may be used without departing from the disclosed technique.

Figure 5:
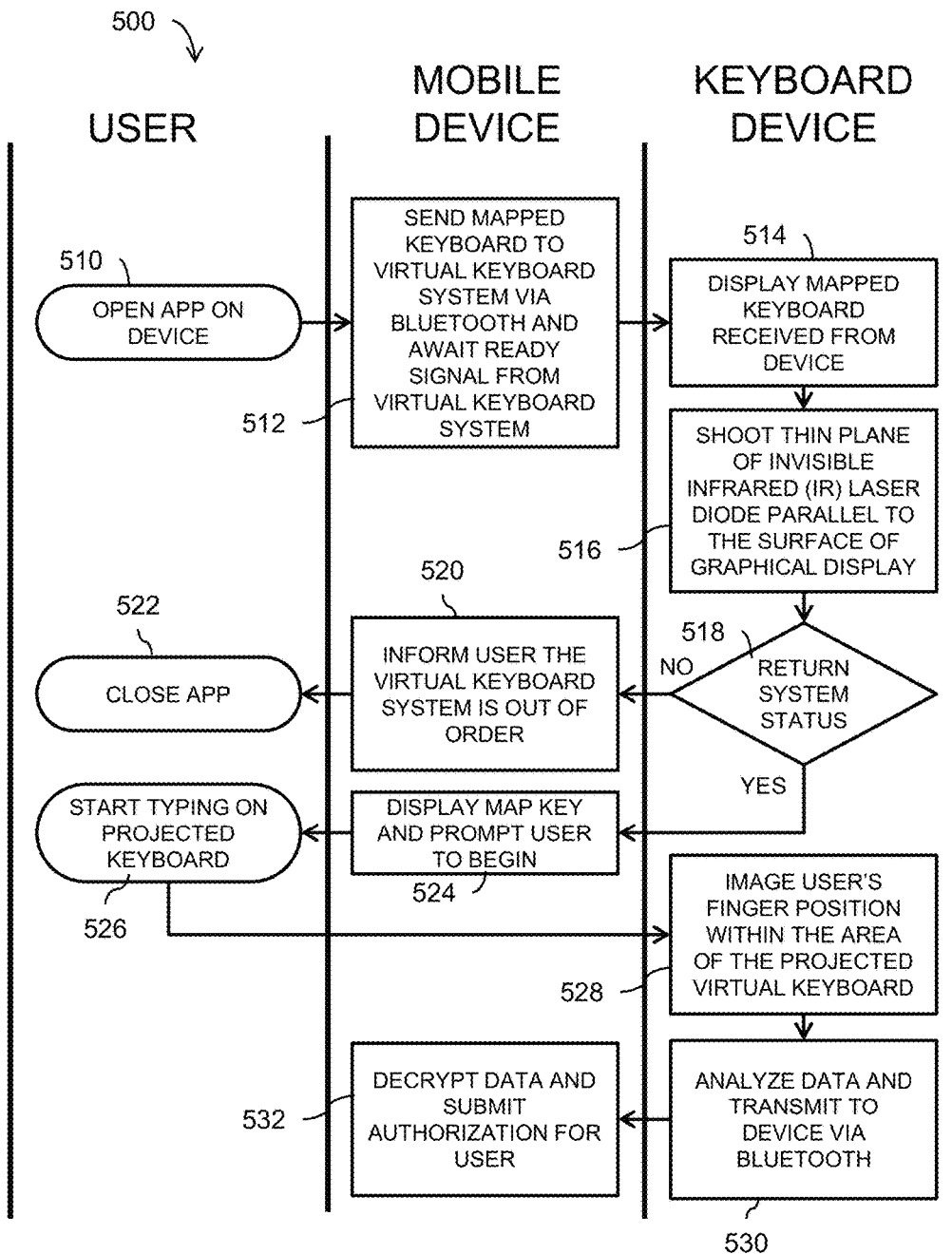
FIG. 5 is a timing chart showing interactions among a user, a mobile device and a keyboard device according to embodiments of the disclosure.

Transactions and synchronization among the user, the user's mobile device and the keyboard device permit the secure entry of data in a public place, as illustrated in the sequence diagram 500 of FIG. 5. A user initially opens an app at operation 510 on his or her mobile device. The app causes the mobile device to communicate via a short range wireless link such as a Bluetooth® radio link with the keyboard device. Specifically, the mobile device transmits at operation 512 a grid pattern map that has been produced by the app on the mobile device.

Figure 4:
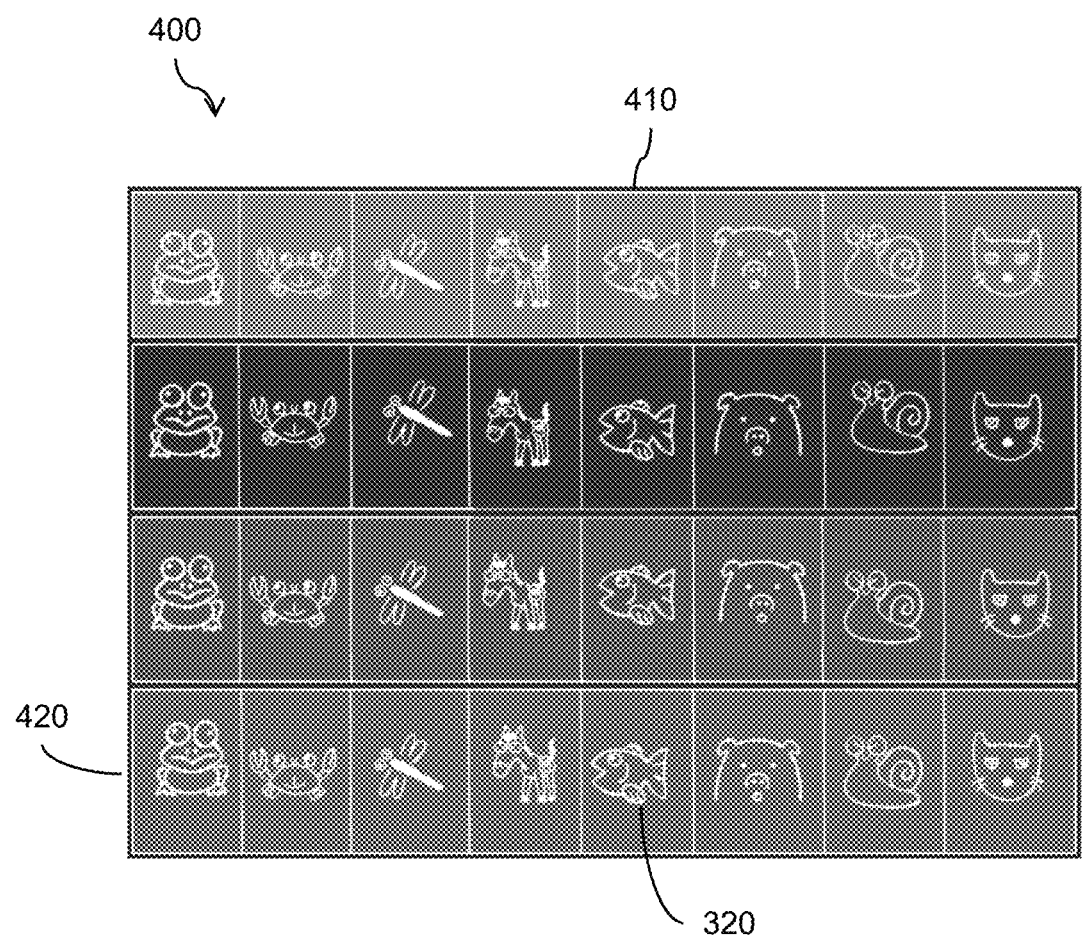
FIG. 4 is a representation of an input grid according to embodiments of the disclosure.

In the case of a keyboard device using a virtual keyboard, the keyboard device then displays input keys at operation 514 such as those arranged in the keypad 400 shown in FIG. 4. Any key configuration may be used; however, it is preferable to arrange the input keys to maximize the ease of finding the keys in the arrangement. In the case where the keyboard device utilizes a fixed or mechanical keyboard, this operation is, of course, unnecessary.

The keyboard device then activates the input keyboard at operation 516. In the case of a projected keyboard layout with an infrared sensor, a thin infrared light plane is scanned across the key representation. If a capacitive touch screen or a mechanical keyboard is used, then those components are activated. The input keyboard is queried to confirm whether or not it is operational at decision block 518. If not, then a message is sent to the user's mobile device at operation 520 informing the user that the keyboard is out of order, and the user closes the app at operation 522.

If the keyboard is confirmed to be operational, then a message is sent from the keyboard device to the mobile device at operation 524 to prompt the user to begin typing. At this point, or earlier in the process, a mapped key such as the modified keyboard representation 300 of FIG. 3 is displayed on the mobile device to inform the user which codings correlate with which characters or keys to be input. The user then types characters on the input keyboard of the keyboard device at operation 526. The user uses the mapped key displayed on the mobile device to aid in selecting keys on the input keyboard. The keyboard device registers each time a keystroke is sensed at operation 528. For example, in the case of an infrared sensor, the keyboard device registers a location each time the light plane is broken.

In the embodiment shown in FIG. 5, the keyboard device analyzes the data from the keyboard to determine which key was input, and, at operation 530, transmits data representing each keystroke via a wireless short range connection to the user's mobile device. The mobile device, at operation 532, decrypts the data by matching the keystroke to an intended input character or key using the mapping. The mobile device then transmits the intended input to a server or system requiring user authorization.

Alternatively, the keyboard device may transmit the representation of the keystroke directly to a server or system having a copy of the mapping. The system or server then decrypts the keystroke data and performs user authorization.

Figure 6:
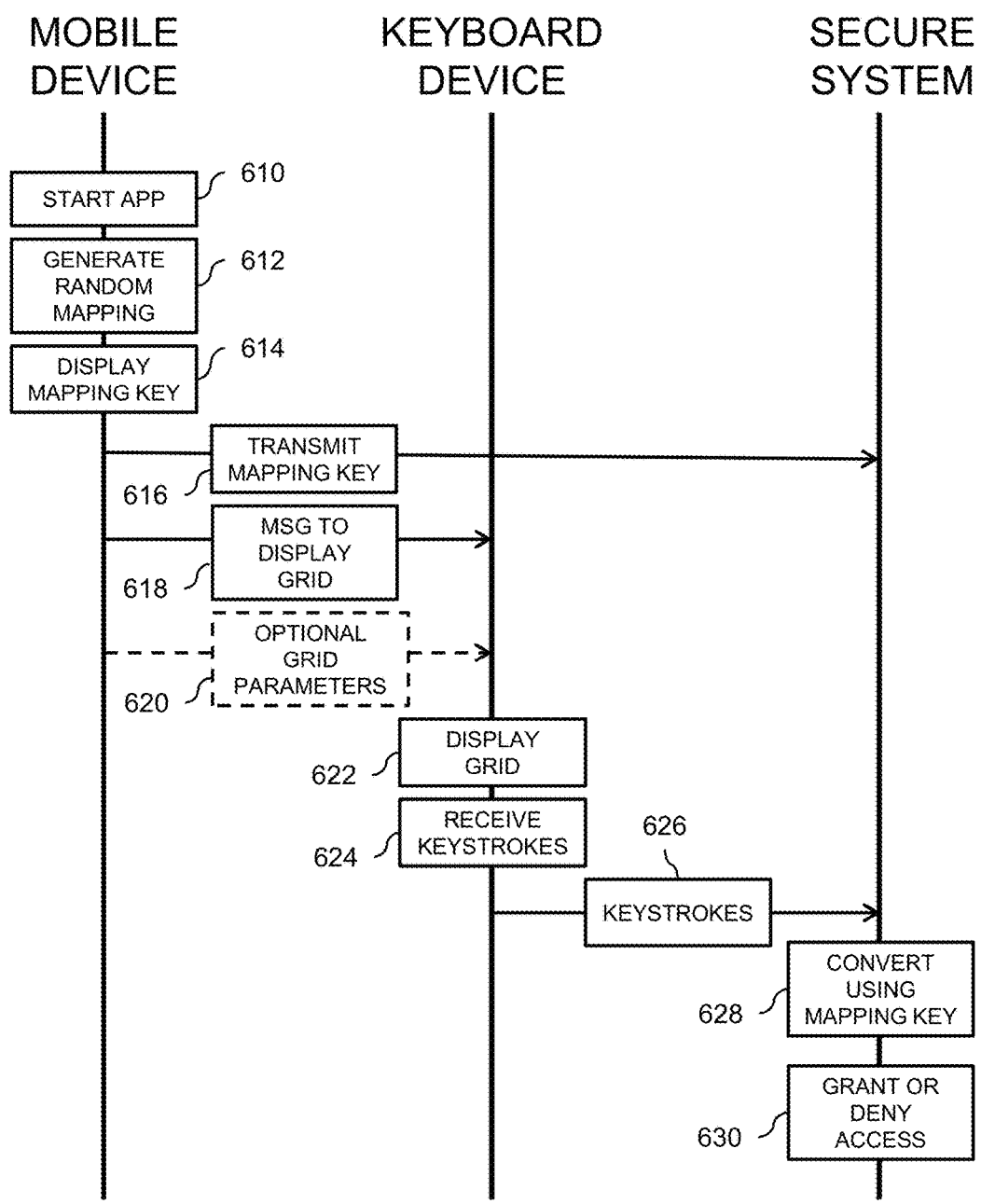
FIG. 6 is a timing chart showing interactions among a mobile device, a keyboard device and a secure system according to embodiments of the disclosure.

A sequence chart 600, shown in FIG. 6, illustrates operations among a mobile device, a keyboard device and a server according to embodiments of the disclosure. The sequence shown in the chart 600 may be used, for example, in an application where the authorizing server is located in proximity to the keyboard device. For example, the arrangement may be used in a key code entry system where a series of characters must be typed to gain entry through a door, or in an ATM system where a PIN is typed to gain access to a bank account. In either case, an observer of a prior art system has access to unprotected security information.

A user desiring to securely type a code initially starts an app on his or her mobile device at operation 610. The mobile device produces a random mapping at operation 612. The mapping may be produced using a random number generator to compute the mapping, by selecting a mapping from a pseudorandom database, by loading a mapping from a server, or by other means. A mapping key, such as the modified keyboard of FIG. 4, is then displayed to the user at operation 614 using the display of the mobile device.

The mobile device then transmits the mapping key to a server in the secure system at operation 616. The transmission may be via a secure link using the cellular data service to which the mobile device is connected and the Internet or another wide area network. A feature of the presently disclosed technique is that the mapping key is not transmitted to the keyboard device. Because the keyboard device is the most susceptible device in the system to tampering or eavesdropping by the public, and because the keyboard device receives the coded keystrokes, this feature greatly reduces vulnerability of the overall system.

The mobile device then transmits at operation 618 a message to the keyboard device to display an input grid of characters or symbols. The message may be a simple command to accept keystrokes, as in the case where the keyboard device utilizes a mechanical keyboard or a fixed virtual keyboard configuration. Optionally, the command may include, at operation 620, additional parameters for displaying the input grid. For example, a particular user may have a specific preferred input grid, wherein the user may have learned the location of the various characters. The user can repeatedly use that input grid without compromising security because the meaning of the typed characters changes with each use.

The keyboard device then makes the input grid available for input at operation 622 by monitoring for keystrokes and, if a virtual keyboard is used, then by displaying the input grid. The keystrokes are then received by the keyboard device at operation 624.

The keyboard device transmits data representing the keystrokes at operation 626 to the secure system server. The transmission may be via a local area network or a communications bus if the keyboard device is collocated with the secure system server. If the secure system server is remote from the keyboard device, the keystrokes may be transmitted via a wide area network such as the Internet. The keystrokes as transmitted do not contain meaningful security information.

The secure system server, which is already in possession of the mapping key, converts the keystrokes to the intended user input using the mapping key at operation 628. Based on the converted keystrokes, the server grants or denies access or takes some other security-related action at operation 630.

Figure 7:
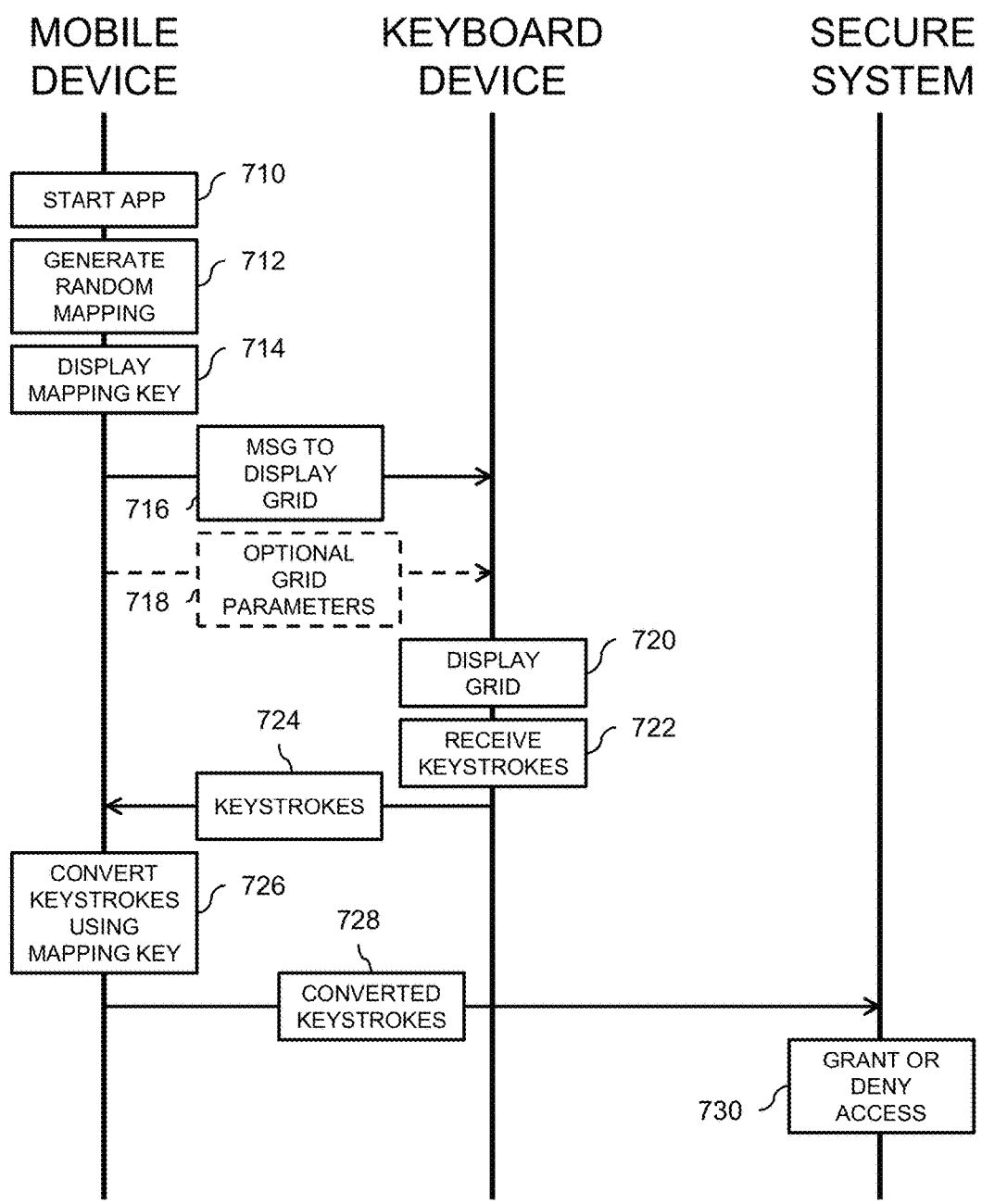
FIG. 7 is another timing chart showing interactions among a mobile device, a keyboard device and a secure system according to embodiments of the disclosure.

Another sequence chart 700, shown in FIG. 7, illustrates operations among a mobile device, a keyboard device and a server according to other embodiments of the disclosure. In that sequence, the mobile device retains control of the mapping, and converts the keystrokes to the intended characters. Such an arrangement is especially useful in situations where the mobile device does not include a keyboard input, as is the case with many wearable devices. Wearable devices are often equipped to accept audio input, but that input mode is not effective for secure input in crowded spaces.

Using the mobile device, a user starts the app at operation 710, and the mobile device generates a random mapping at operation 712 and displays the mapping key at operation 714. The mobile device additionally commands the keyboard device, via a short range wireless link or other means, to display the input grid at operation 716, optionally using any grid parameters at operation 718.

The keyboard device displays the input grid at operation 720 and accepts keystrokes at operation 722. The keystrokes are transmitted at operation 724 back to the mobile device. That transmission may utilize the short range wireless link.

The keystrokes are converted by the mobile device at operation 726. The mapping key is never transmitted by the mobile device; there is therefore a very low security risk in the short range transmissions between the mobile device and the keyboard device. The mobile device then transmits the converted keystrokes to a secure system server. That transmission may be made via the cellular data network and the Internet. The transmission must be secured and encrypted because it contains the converted keystrokes of the user. Based on the converted keystrokes, the secure system server grants or denies access to the secure system.

The arrangement illustrated by chart 700 is advantageous in that the app running on the mobile device is self-contained, without any need for additional special software on the secure system server. Instead, the secure system server receives a typed password or other security information in a manner similar to that of other applications in which a password is used.

The mobile device, the keyboard device and the various servers discussed above each comprise one or more processors, together with input/output capability and computer readable media having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the devices also includes memory that functions as a data memory that stores data used during execution of programs in the processors, and is also used as a program work area. The memory may also function as a program memory for storing a program executed in the processors. The program may reside on any tangible, non-volatile computer-readable media as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

In sum, the above-described method, system and computer readable media provide a randomized coded mapping to be displayed on any surface through a virtual keyboard, and the ability to customize the coded mapping icons to match the user's personal preference (e.g. animals, military, flowers, tools, etc.). The system is adaptable to any public environment and is migratable to any mobile device.

The described system adds value in many situations. The risk, and associated costs, of identity theft are greatly reduced. The ability perform online transactions anywhere, at any time, increases e-commerce overall.

As the use of wearable technology increases, the need for performing secure transactions using that technology will also increase. The disclosed techniques provide a necessary piece of the security puzzle.

The use of a flexible, user-defined keyboard allows the user to select a style from multiple keyboard style options. For example, a color scheme generator may be customized for individuals with color blindness. The display size may be adjustable on a projected virtual keyboard to accommodate sight-impaired individuals. The crypto-theme may be customizable (such as the animals used in FIG. 4).

The described system may be implemented by a wide variety of businesses, from traditional brink-and-mortar models to an e-commerce model. For example, a brick-and-mortar store location that may wish to use a mobile point-of-sale structure, wherein customers type in passwords to debit cards anywhere in the store. The presently described system ensures that any potential eavesdropper would be thwarted.

The described technology is configurable to support persons with disabilities. In one example, the system is configurable to a larger virtual keyboard, allowing a person who could not operate the small keys on a traditional keyboard access to the modern conveniences of a mobile device, without compromising security.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A method for execution by a mobile device for securing a keyed input by a user through a keyboard device separate from the mobile device, comprising:
   producing a mapping correlating characters in a standard alphabet to key codings;
   displaying, on a display of the mobile device, a representation of the mapping permitting the user to translate the characters in the standard alphabet to the key codings;
   transmitting from the mobile device to the keyboard device a command to cause the keyboard device to receive keystrokes input by the user on a keyboard comprising the key codings, without transmitting the mapping from the mobile device to the keyboard device;
   receiving by the mobile device from the keyboard device representations of the keystrokes indicating which keys are input;
   converting the keystrokes to characters in the standard alphabet using the mapping, to determine a user input; and
   transmitting the user input to a server.

2. The method of claim 1, further comprising:
   transmitting from the mobile device to the keyboard device a command to configure a virtual keyboard, the command comprising the key codings for accepting the keystrokes.

3. The method of claim 2, wherein the key codings comprise a first characteristic and a second characteristic and the command to configure the virtual keyboard comprises a command to display a grid having rows representing the first characteristic and columns representing the second characteristic.

4. The method of claim 1, wherein producing a mapping further comprises generating a random mapping.

5. The method of claim 1, wherein displaying a representation of the mapping further comprises displaying a representation of a standard keyboard wherein keys are identified by characters of the standard alphabet together with correlated key codings.

6. The method of claim 1, wherein transmitting to the keyboard device and receiving from the keyboard device are performed via a short range wireless link.

7. The method of claim 6, wherein transmitting the user input to a server is performed via a cellular radio network.

8. A tangible computer-usable medium having computer readable instructions stored thereon that, when executed by a processor of a mobile device, cause the processor to perform operations for securing a keyed input by a user through a keyboard device separate from the mobile device, the operations comprising:
   producing a mapping correlating characters in a standard alphabet to key codings;
   displaying, on a display of the mobile device, a representation of the mapping permitting the user to translate the characters in the standard alphabet to the key codings;
   transmitting from the mobile device to the keyboard device a command to cause the keyboard device to receive keystrokes input by the user on a keyboard comprising the key codings, without transmitting the mapping from the mobile device to the keyboard device;
   receiving by the mobile device from the keyboard device representations of the keystrokes indicating which keys are input;
   converting the keystrokes to characters in the standard alphabet using the mapping, to determine a user input; and
   transmitting the user input to a server.

9. The tangible computer-usable medium of claim 8, further comprising:
   transmitting from the mobile device to the keyboard device a command to configure a virtual keyboard, the command comprising the key codings for accepting the keystrokes.

10. The tangible computer-usable medium of claim 9, wherein the key codings comprise a first characteristic and a second characteristic and the command to configure the virtual keyboard comprises a command to display a grid having rows representing the first characteristic and columns representing the second characteristic.

11. The tangible computer-usable medium of claim 8, wherein producing a mapping further comprises generating a random mapping.

12. The tangible computer-usable medium of claim 8, wherein displaying a representation of the mapping further comprises displaying a representation of a standard keyboard wherein keys are identified by characters of the standard alphabet together with correlated key codings.

13. The tangible computer-usable medium of claim 8, wherein transmitting to the keyboard device and receiving from the keyboard device are performed via a short range wireless link.

14. The tangible computer-usable medium of claim 13, wherein transmitting the user input to a server is performed via a cellular radio network.

15. A method for execution by a mobile device for securing a keyed input by a user through a keyboard device separate from the mobile device, comprising:
   producing a mapping correlating characters in a standard alphabet to key codings;
   transmitting of the mapping from the mobile device to a secure system server, making the secure system server operable to translate keystrokes on a keyboard comprising the key codings to characters in the standard alphabet;

displaying on a display of the mobile device a representation of the mapping, the representation of the mapping permitting the user to translate characters of the standard alphabet to the key codings; and transmitting from the mobile device to the keyboard device a command to cause the keyboard device to receive keystrokes input by the user on a keyboard comprising the key codings and to transmit representations of the keystrokes indicating which keys are input to the secure system server, without transmitting the mapping from the mobile device to the keyboard device.

16. The method of claim 15, further comprising:

transmitting from the mobile device to the keyboard device a command to configure a virtual keyboard, the command comprising the key codings for accepting the keystrokes.

17. The method of claim 16, wherein the key codings comprise a first characteristic and a second characteristic and the command to configure the virtual keyboard comprises a command to display a grid having rows representing the first characteristic and columns representing the second characteristic.

18. The method of claim 15, wherein producing a mapping further comprises generating a random mapping.

19. The method of claim 15, wherein displaying a representation of the mapping further comprises displaying a representation of a standard keyboard wherein keys are identified by characters of the standard alphabet together with correlated key codings.

20. The method of claim 15, wherein transmitting to the keyboard device is performed via a short range wireless link, and transmitting to the secure system server is performed via a cellular wireless radio network.

* * * * *